(12) United States Patent
Sturzel et al.

(10) Patent No.: US 8,594,373 B2
(45) Date of Patent: Nov. 26, 2013

(54) METHOD FOR IDENTIFYING AN OBJECT IN A VIDEO ARCHIVE

(75) Inventors: Marc Sturzel, Montrouge (FR); Frédéric Jurie, Epron (FR)

(73) Assignee: European Aeronautic Defence and Space Company-EADS France, Paris (FR)

( * ) Notice: Subject to any disclaimer, the term of this patent is extended or adjusted under 35 U.S.C. 154(b) by 168 days.

(21) Appl. No.: 13/059,962

(22) PCT Filed: Aug. 26, 2009

(86) PCT No.: PCT/EP2009/060960
§ 371 (c)(1),
(2), (4) Date: Jul. 14, 2011

(87) PCT Pub. No.: WO2010/023213
PCT Pub. Date: Mar. 4, 2010

(65) Prior Publication Data
US 2012/0039506 A1    Feb. 16, 2012

(30) Foreign Application Priority Data

Aug. 27, 2008 (FR) ..................................... 08 55737

(51) Int. Cl.
*G06K 9/00* (2006.01)
(52) U.S. Cl.
USPC ........... 382/103; 382/181; 382/190; 382/118; 382/224; 348/77; 348/147; 348/169
(58) Field of Classification Search
USPC .............. 382/103, 181, 190, 224, 118; 348/7, 348/143, 169
See application file for complete search history.

(56) References Cited

U.S. PATENT DOCUMENTS

| 6,009,204 | A * | 12/1999 | Ahmad ......................... 382/236 |
| 7,127,087 | B2 * | 10/2006 | Huang et al. ................... 382/118 |
| 7,336,807 | B2 * | 2/2008 | Tabata .......................... 382/118 |
| 7,606,425 | B2 * | 10/2009 | Bazakos et al. ............... 382/224 |
| 7,683,929 | B2 * | 3/2010 | Elazar et al. .................. 348/169 |
| 8,229,249 | B2 * | 7/2012 | Seki .............................. 382/291 |
| 8,311,277 | B2 * | 11/2012 | Peleg et al. ................... 382/103 |
| 2002/0175997 | A1 * | 11/2002 | Takata et al. .................. 348/143 |

(Continued)

FOREIGN PATENT DOCUMENTS

| EP | 1260934 | 11/2002 |
| WO | WO 2007/140609 | 12/2007 |

OTHER PUBLICATIONS

International Search Report dated Oct. 6, 2009 for PCT Application No. PCT/EP2009/060960.

(Continued)

*Primary Examiner* — Stephen R Koziol
*Assistant Examiner* — Shaghayegh Azima
(74) *Attorney, Agent, or Firm* — Knobbe Martens Olson & Bear LLP

(57) ABSTRACT

A method for identifying an object in a video archive including multiple images acquired in a network of cameras including a phase of characterization of the object to be identified and a phase of searching for the object in the archive, where the characterization phase consists of defining for the object at least one semantic characteristic capable of being extracted, even in low-resolution images, from the video archive.

7 Claims, 1 Drawing Sheet

(56) References Cited

U.S. PATENT DOCUMENTS

| | | | |
|---|---|---|---|
| 2004/0095377 A1* | 5/2004 | Salandro | 345/723 |
| 2005/0147292 A1* | 7/2005 | Huang et al. | 382/159 |
| 2005/0232574 A1* | 10/2005 | Kawai | 386/46 |
| 2006/0287988 A1* | 12/2006 | Mason | 707/3 |
| 2008/0069411 A1* | 3/2008 | Friedman et al. | 382/118 |
| 2008/0140523 A1* | 6/2008 | Mahoney et al. | 705/14 |
| 2009/0046933 A1* | 2/2009 | Gallagher et al. | 382/224 |
| 2009/0226034 A1* | 9/2009 | Seki | 382/103 |
| 2009/0274434 A1* | 11/2009 | Mei et al. | 386/52 |
| 2010/0092037 A1* | 4/2010 | Peleg et al. | 382/103 |
| 2011/0135153 A1* | 6/2011 | Tsurumi et al. | 382/103 |
| 2011/0242319 A1* | 10/2011 | Miyajima | 348/148 |
| 2012/0237129 A1* | 9/2012 | Stojancic et al. | 382/197 |
| 2013/0027551 A1* | 1/2013 | Peleg et al. | 348/143 |

OTHER PUBLICATIONS

Search Report from related application FR 0855737 dated Mar. 31, 2009.

* cited by examiner

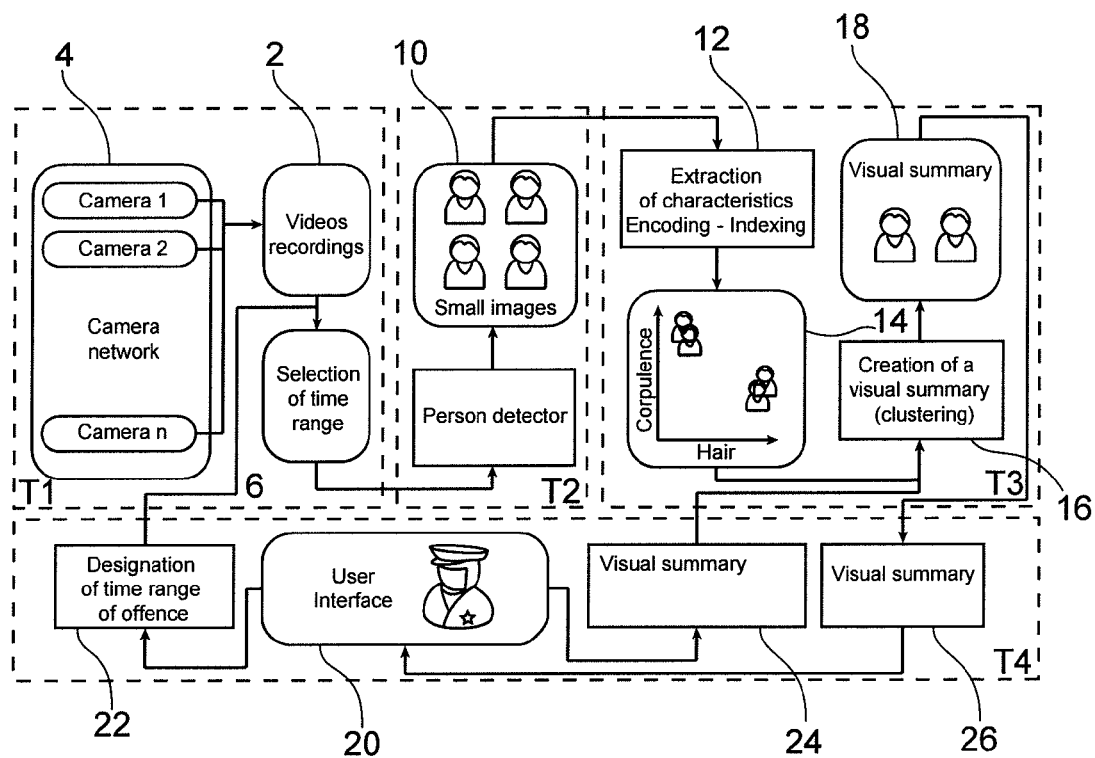

METHOD FOR IDENTIFYING AN OBJECT IN A VIDEO ARCHIVE

TECHNICAL FIELD

The invention is in the field of the search for information in a video archive, and relates more specifically to a method and a device for identifying an object in a video archive including many images acquired from a network of cameras.

The invention also concerns a computer program recorded on a recording medium and able, when executed on a computer, to implement the method according to the invention.

STATE OF THE PRIOR ART

Modern databases enable increasing quantities of information of different types (data, text, audio, video, etc.) to be archived. The efficiency with which a database can be used depends notably on the model used to structure the data in the database.

In a hierarchical model the information is organised according to a tree structure with a hierarchy, accessible only from the root of this tree structure.

The main defect of this representation derives from the fact that there is a unique point of access to the information consisting of the root of the hierarchical tree, resulting in problems in seeking information.

The data can also be organised according to a network model in the form of a graph in which the archived entities are linked to one another using logical pointers.

Object-oriented databases are also known, capable of storing multiple information in objects such as, for example, an individual form, a machine, a resource, etc., with which values and attributes are associated.

Several avenues of research have proposed a semantic model for databases in which the data is organised according to a concept map consisting of a representation of a collection of concepts linked semantically to one another. However, no semantic model is yet available.

Whatever the type of database, a fundamental problem derives from the fact that it is particularly difficult rapidly to identify an object in a video archive of a database containing a large number of images, particularly when very little information on the sought object is available.

Such a situation occurs, for example, during a search, on the basis of a simple description, for an individual who has not previously been identified, in a video-surveillance archive containing thousands of hours of recording.

In this context it is currently necessary to view manually all the recorded video archives.

Apart from the fact that this procedure is excessively fastidious and will more so the larger the number of cameras in networks of video-surveillance cameras, and the greater the density of these networks, it is unsuitable for emergency situations in the case of a search for an individual on the run. In addition, it implies prohibitive analysis times which are incompatible with the need to make rapid progress with the investigations.

One aim of the invention is to optimise navigation in such a database by automating the analysis in order to accelerate the procedure of searching in a video archive.

Another aim of the invention is to enable a human operator to have access to structured visual summaries of the objects present in a varied video database.

Another aim of the invention is to give the human operator optimised tools for navigating in the database by means of an interactive search strategy.

SUMMARY OF THE INVENTION

These aims are archived by means of a method for identifying an object in a video archive comprising many images acquired in a network of cameras, including a phase of characterisation of the object to be identified and a phase of searching for the said object in the said archive, where the said characterisation phase consists in defining for the said object at least one semantic characteristic capable of being extracted from the said video archive, even for low-resolution images, and directly interpretable by an operator, where the said search phase consists in filtering the images from the said video archive according to the previously defined semantic characteristic, in extracting automatically from the said archive the images containing an object having the said semantic characteristic, in defining a group of objects comprising all the objects present in the video archive having the said semantic characteristic, and in measuring the similarity of the object to be identified with every other object of the previously defined group according to the visual and space-time characteristics in relation to the itinerary of the object to be identified in the space covered by the network of cameras.

According to another characteristic of the invention the step of measurement of similarity includes the following steps:

estimating the compatibility of the semantic characterisation of the object to be identified with the semantic characteristic extracted from the images of the other objects in the previously defined group, and/or, estimating the space-time compatibility of the itinerary of the object to be identified with the itinerary of another object in the previously defined group having a similar semantic characteristic, and not having any characteristic incompatible with that of the object to be identified, The method according to the invention preferentially also includes a step consisting in assigning a probability coefficient to each measurement of similarity.

The method according to the invention also includes a step consisting in merging the results of the steps of measurement of the similarity so as to define a single unified measurement of similarity, enabling a distance in the space of the objects to be identified to be defined.

In addition, the method according to the invention includes a dynamic structuring of this space of the objects of interest, by means of the previously defined distance, so as to be able to navigate interactively in the video archive using a hierarchical tree.

The invention applies in the search for a human being in which the said object to be identified is a human being for whom only a brief description is available. In this application the semantic characteristic of the said human being consists of a visible physical characteristic and/or a visible accessory.

The invention is particularly advantageous for searching for a suspect in a video archive including several video sequences taken by several cameras distributed in a space covered by a network of remote surveillance cameras.

The method according to the invention is implemented by means of a device for identifying an object in a video archive comprising many images acquired in a network of cameras, characterised in that it includes a module for characterisation of the object to be identified and a module for searching for the said object in the said archive, where the said characterisation modules includes means for defining for the said object at least one semantic characteristic capable of being extracted from the said video archive, even for low-resolution images, and directly interpretable by an operator, where the said search module includes means for filtering the images from the said video archive according to the previously defined semantic characteristic, means for extracting automatically from the said archive the images containing an object having the said semantic characteristic, means for defining a group of objects comprising all the objects present in the video archive having the said semantic characteristic, and means for measuring the similarity of the object to be identified with every other object of the previously defined group according to the visual and space-time characteristics in relation to the itinerary of the object to be identified in the space covered by the network of cameras.

Preferentially, the said means for measurement of similarity include:
 a first computation module configured to estimate the compatibility of the semantic characteristic of the object to be identified with the semantic characteristic extracted from the images of the other objects of the previously defined group, and/or,
 a second computation module configured to estimate the space-time compatibility of the itinerary of the object of the identified with the itinerary of another object in the previously defined group having a semantic characteristic similar to that of the object to be identified.

The method according to the invention is implemented in the said device by a computer program recorded on a recording medium and suitable, when it is executed on a computer, for identifying an object in a video archive comprising many images acquired in a network of cameras, where the said computer program includes instructions to execute a phase of characterisation of the object to be identified and instructions to execute a phase of searching for the said object in the said archive, where the said characterisation phase consists in defining for the said object at least one semantic characteristic capable of being extracted from the said video archive, even in relation to low-resolution images, and directly interpretable by an operator, where the said searching phase consists in filtering the images from the said video archive according to the previously defined semantic characteristic, in extracting automatically from the said archive the images containing an object having the said semantic characteristic, in defining a group of objects comprising all the objects present in the video archive having the said semantic characteristic, and in measuring the similarity of the object to be identified with every other object of the previously defined group according to the visual characteristics and constraints on the space-time itinerary of the object to be identified in the space covered by the network of cameras.

BRIEF DESCRIPTION OF THE ILLUSTRATIONS

Other characteristics and advantages of the invention will become clear from the following description, which is given as a non-restrictive example, with reference to the appended FIGURE.

DETAILED ACCOUNT OF PARTICULAR EMBODIMENTS

The invention will be described in the context of a particular application in which an existing extended network of video surveillance cameras is considered, such as, for example, that of an urban transport network, or that of an airport. We adopt the perspective of a typical context of an investigation following an incident (attack, theft, terrorist act).

It is also presupposed that several witnesses give a description of a suspect. The goal is then rapidly to find images of the incident, if any exist, and to discover the complete itinerary of the suspect in the area covered by the network of cameras, in order to determine the space-time itinerary, and in order to identify them.

The traditional approach consists in viewing the images taken by the cameras close to the indicated location of the incident, and at instants close to that indicated by the witnesses, in order to identify the incident in the video-filmed archive.

The approach proposed by the present invention consists in using the descriptions given by the witnesses to systematise the search for the suspect, and to filter the data before optimising the search for the images in the video surveillance archive.

To this end, the description of the suspect given by the witnesses is used to define semantic information relating to the suspect. Thus, the latter may, for example, be tall, very thin, wear a long black coat and sunglasses, and have a beard and long hair. Some of these characteristics are capable of being used by the method according to the invention, and programmed directly into the system.

The latter automatically pre-processes all the video data present in the archive. This pre-processing includes the following steps:
 analysing all the moving objects and tracking them, notably taking into account occlusions and stoppages;
 detecting the persons in the images of the archive,
 characterising each of the identified persons using specialist algorithms which, on the basis of a specified input, give at the output a list of semantic attributes, and for each attribute a measure of confidence, probability and/or plausibility.

In a preferred embodiment of the invention, the detection of the movements is accomplished by modelling the scene by means of blending of Gaussians (where the background is fixed), and the tracking is accomplished by means of a Kalman filter, and subsequently completed by a local analysis, using local descriptors of the SIFT or SURF type, for example, or possibly simpler and more occasional forms of modelling, in order to resolve the ambiguities due to the occlusions.

In this embodiment the detection of the persons is obtained, for example, by detecting the faces through the use of cascaded classifier techniques, such as Adaboost® and Haar filter techniques, and then possibly by working back to the complete body outline by shape analyses with, possibly, postulates concerning the physionomical ratios or individual detectors based on learning techniques.

The specialist algorithms used to characterise each of the persons are preferentially, for example, classifiers capable of indicating whether an individual has long or short hair, does or does not have a beard, has a very round or rather long face, is stout or has a slim silhouette, etc.

A measurement of reliability of the response is advantageously given for each of the elements of information extracted. These characterisations (or descriptors extracted from the images) can be interpreted directly by a human operator and can be related directly to the semantic information collected during a witness's account. Moreover, they are computed even for low-resolution images. Indeed, it is not necessary to have a width consisting of hundreds of pixels in relation to a face to determine whether a person is wearing spectacles.

In the preferred embodiment the classifiers are obtained using the method described below:

images are extracted locally from the descriptors in relation to the extracted thumbnails (for example, in order to determine whether a person has a beard, the lower half of the face detection mask is considered); these descriptors can, for example, be histograms of colours, gradients, space distribution properties characterising the textures, responses to filters (Gabor filters, for example), etc.;

classifiers are then constructed by machine learning in order to indicate which faces have the "beard" characteristic; an alternative approach consists in learning distance measurements specific to these characteristics, and then in using these specific distances to determine the proximity or difference between two faces in relation to certain semantic aspects. The measurement of reliability can be supplied directly by the classifier. It can also be modelled after the event by, for example, translating the previous outputs into probabilities. In addition, it is also possible to bring into play criteria concerning the quality of the images of the archive in order to determine whether the estimate of the semantic feature in a thumbnail is or is not reliable. Thus, a very noisy image, or one which is highly distorted by compression artifacts is much more difficult to analyse, and in this case the estimates are naturally less safe and less reliable.

When space-time information is available enabling the cameras to be linked, this is used to establish first links between the observations made in different cameras.

Thus, if the relative positions of the various cameras and the areas of the fields of view are known, it is possible to establish space-time related compatibilities between the movements in the different cameras; this notably enables it to be said that an entity the global speed of which has been measured cannot appear before a certain date in a video, and will probably appear around a predictable date, through the knowledge of the speed of movement. The space-time compatibility constraints can be binary (a person cannot be in two places at the same time), or vague (uncertain confidence value, i.e. greater or lesser probability). Using these constraints, observations between several cameras can be related to one another, and more or less complex and reliable relationships are therefore established between all the entities in the database.

From this point forth the video surveillance archive is represented by a database of semantic data associated with each individual seen in at least one of the videos.

The structuring of the semantic database includes the following steps:

The description given by the witnesses is used. This description includes semantic characteristics, possibly with associated confidence measurements, depending on the memories of the witnesses and the consistency of the declarations;

a filter is applied, within the database, using the said semantic characteristics, keeping only those individuals having these characteristic features, and eliminating all individuals without these features;

all individuals having similar appearances are grouped in hierarchical fashion; in other words, individuals are grouped on the basis of similarity criteria, establishing for each group and for each sub-group a common characterisation of the individuals of the group. Given that the measurements of similarity between individuals are based on semantic criteria, the hierarchical grouping can also be qualified as semantic. Thus, two images are not grouped solely due to the fact that they resemble one another (two individuals wearing exactly the same clothes), but also because they have one or more common elements of descriptive information (two individuals with a beard and sunglasses, for example). Advantageously, the structuring of the database may be dynamic. To this end, one need merely add, delete or modify semantic criteria for the hierarchical structuring to be able to be updated in order to reflect the operator's expectations. Thus, it is possible to qualify the reliability of an item of information of corpulence, or to add a new item of information concerning the shape of the face and the wearing of a cap. It is also conceivable that new forms of structuring may be suggested automatically to the user.

When the database has been structured the user can navigate effectively in the database according to the individuals and their characteristics, and no longer according to the cameras and the elapsing of time.

When an individual is designated the corresponding video sequence can be viewed; this designation enables the visual appearance to be specified more accurately, which enables the similarity measurements to be completed. Furthermore, it provides space-time information concerning the location of the individual. Thus, the previously filtered database is filtered once again to eliminate all the individuals whose positions and dates of acquisition do not match the space-time constraints of the normal movement of the designated individual;

The remaining individuals are ordered according to a combination of semantic factors, appearance characteristics and the probability that this is indeed the designated individual, by means of space-time constraints relating to movement (since a distance can be estimated, a probable speed can be calculated, and a maximum speed defined). The user can then browse through this ordered list and undertake very efficiently and very rapidly tracking and back-tracking (which consists in going back in time) of the designated individual, by browsing the archive using the space-time constraints, the semantic properties and the appearance criteria, without having to be concerned with the selection of the cameras or the time-stamping of the data.

The appended FIGURE describes the principal steps of the method according to the invention in the context of the application described above.

In the course of phase T1 images of a scene are recorded (step 2) by a network of cameras 4 including several cameras distributed geographically over a zone under surveillance.

In step 6 a time range is selected during which the recorded images will be analysed.

In the course of phase T2 the individuals in the recorded images are detected (step 8) and small images of the detected individuals are generated (step 10).

In the course of phase T3, semantic characteristics of the said small images are extracted (step 12). The latter are then encoded and indexed.

In step 14 the small images with one or more descriptive common items of information are grouped together. A file with a visual summary of the images is generated in step 16 and then displayed in step 18.

Phase T4 describes the use by an operator 20 of the database constituted in the course of phases T1 to T3.

In step 22 the operator designates the time range of the filmed event.

In step 24 the operator supplies, via a user interface, attributes of the sought individual. The system displays (step 26) the images filtered from the structured database which have been generated in the course of the previous steps.

The particular embodiment described above is applied to individuals. The concept may be applied more widely to other entities, such as vehicles, for example.

The invention claimed is:

1. A method for identifying an object in a video archive comprising a plurality of images in a network of cameras, the method comprising:

a phase of characterization of the object to be identified and a phase of searching for the object to be identified in the video archive, wherein the characterization phase comprises defining for the object at least one semantic characteristic capable of being extracted from the video archive, even for low-resolution images, the at least one semantic characteristic being directly interpretable by an operator, and wherein the search phase comprises:

filtering the images from the video archive according to the previously defined semantic characteristic;

extracting automatically from the archive the images containing an object having the semantic characteristic;

defining a group of objects comprising all the objects present in the video archive having the semantic characteristic; and measuring the similarity of the object to be identified with every other object of the previously defined, wherein the measurement of the similarity includes:

estimating the compatibility of the semantic characterization of the object to be identified with the semantic characteristic extracted from the images of the other objects in the previously defined group, and estimating a space-time compatibility of the itinerary of the object to be identified with the itinerary of another object in the previously defined group having a similar semantic characteristic and not having any characteristic incompatible with that of the object to be identified.

2. A method according to claim 1, further comprising assigning a probability coefficient to each measurement of similarity.

3. A method according to claim 2, further comprising merging the results of the measurements of the similarity so as to define a single unified measurement of similarity; and enabling a distance in the space of the object to be identified.

4. A method according to claim 3, further comprising undertaking a dynamic structuring of the space of the objects to be identified by means of the distance so as to navigate interactively in the video archive using a hierarchical tree.

5. A method according to claim 4, wherein the object to be identified is a human being.

6. A method according to claim 5, wherein the semantic characteristic of the human being comprises a visible physical characteristic.

7. A method according to claim 5, wherein the semantic characteristic of the human being comprises a visible clothing accessory.

* * * * *

UNITED STATES PATENT AND TRADEMARK OFFICE
CERTIFICATE OF CORRECTION

PATENT NO. : 8,594,373 B2
APPLICATION NO. : 13/059962
DATED : November 26, 2013
INVENTOR(S) : Sturzel et al.

It is certified that error appears in the above-identified patent and that said Letters Patent is hereby corrected as shown below:

In the Claims

Column 7 at line 10, Claim 1, after "images" insert --acquired--.

Column 7 at line 29, Claim 1, after "defined" insert --group--.

Signed and Sealed this
Ninth Day of September, 2014

Michelle K. Lee
*Deputy Director of the United States Patent and Trademark Office*